United States Patent
Hirota

[11] Patent Number: 5,996,369
[45] Date of Patent: Dec. 7, 1999

[54] AIR CONDITIONER WITH SUB-CONDENSER

[75] Inventor: Hisatoshi Hirota, Tokyo, Japan

[73] Assignees: TGK Co., Ltd.; Calsonic Corporation, both of Tokyo, Japan

[21] Appl. No.: 09/021,465

[22] Filed: Feb. 10, 1998

[30] Foreign Application Priority Data

Aug. 5, 1997 [JP] Japan ................................. 9-210556
Jan. 22, 1998 [EP] European Pat. Off. .............. 98101093

[51] Int. Cl.⁶ .................................................. F25B 13/00
[52] U.S. Cl. ...................... 62/324.6; 137/597; 137/884; 251/118
[58] Field of Search .................. 137/884, 597; 251/118; 62/324.6

[56] References Cited

U.S. PATENT DOCUMENTS

| | | | |
|---|---|---|---|
| 3,556,144 | 1/1971 | Bickers et al. | 137/596.15 |
| 3,602,246 | 8/1971 | Hettinger et al. | 137/270 |
| 3,934,605 | 1/1976 | Legris | 137/271 |
| 4,509,556 | 4/1985 | Scanlon | 137/884 |
| 4,691,795 | 9/1987 | Wehmeyer et al. | 180/6.48 |
| 4,716,741 | 1/1988 | Bednarek | 62/197 |
| 4,757,943 | 7/1988 | Sperling et al. | 236/12.12 |

FOREIGN PATENT DOCUMENTS

| | | |
|---|---|---|
| 0 095 704 | 5/1983 | European Pat. Off. . |
| 36 35 353 | 10/1986 | Germany . |

Primary Examiner—Henry Bennett
Assistant Examiner—Marc Norman
Attorney, Agent, or Firm—Nilles & Nilles SC

[57] ABSTRACT

In a heating system having a refrigerating circuit accompanied with a sub-condenser, an air conditioner with the sub-condenser is designed with simplified piping structure and easy piping work. The system can be easily installed to an electric car and other vehicles. One block 11 is provided, in which a bypass flow path 9, a refrigerant returning flow path 10, connections 12, 13, 14, and 15 between both flow paths 9 and 10 and refrigerant main flow pipe 8, plural solenoid valves 21, 22, and 23 and plural check valves 31, 32, 33, and 34 to control flow passing states at the both flow paths to the refrigerant main flow pipe 8 are incorporated.

13 Claims, 8 Drawing Sheets

AIR CONDITIONER WITH SUB-CONDENSER

BACKGROUND OF THE INVENTION

1. Field of the Invention

This invention relates to an air conditioner with a sub-condenser which can be used for air conditioning without reversing the flow of refrigerant during the refrigerating cycle, particularly for a car or electric car.

2. Discussion of the Related Art

In a conventional air conditioner for a car, a refrigerating cycle is used for cooling and heated engine water is used for heating. But for an electric car, there is no engine defining a powerful heat generating source for heating purposes, so it is necessary to heat using the refrigerating cycle. A heat pump is known using a heat exchanger which is used as an evaporator during cooling by reversing refrigerant flow, but this heat pump is not suitable for a car use because a four-way valve has to be rotated in order to switch between the flow paths. There is known an air conditioner having a sub-condenser installed at the position near the passenger compartment of a car, and being equipped with an evaporator in addition to a main condenser installed at the position not connected to the passenger compartment A bypass flow path is provided for refrigerant not passing the main condenser, as well as a refrigerant returning flow path to return refrigerant from the main condenser to the area between the evaporator and a compressor. By applying these structures, refrigerant can flow into only the sub-condenser but not into the main condenser, and refrigerant accumulated at the main condenser can flow using the compressor through the refrigerant returning flow path, which results in car passenger compartment heating available at the sub-condenser. However, the structures mentioned require a total of four T-shaped connections because both ends of the bypass flow path and both ends of the refrigerant returning flow path have to be connected to the refrigerant main flow piping. This connecting principle is disadvantageous because the piping structure is difficult to arrange, cannot be arranged neatly, and needs troublesome piping works and costly pipings and piping accessories.

OBJECTS AND SUMMARY OF THE INVENTION

It is an object of the invention to provide, as a heating system equipped with a sub-condenser, a compact, space-saving air conditioner and to simplify or even avoid complicated piping structures and related piping work and to allow its simple installation in an electric car, etc.

To achieve the above purpose in the air conditioner with the sub-condenser, the main condenser is installed at a position without connection to the car passenger compartment, the sub-condenser is installed at a position downstream of the main condenser such that it is connected to the car passenger compartment. The refrigerant is circulated in the refrigerant main flow pipe in the refrigerating cycle and is compressed by the compressor, is condensed by the condenser, and is expanded adiabatically to evaporate in the evaporator, and then is returned to the compressor. The bypass flow path, the refrigerant returning flow path, a connection between both flow paths and the refrigerant main flow pipe, and plural solenoid valves and plural check valves to control connecting states of the both flow paths to the refrigerant main flow pipe are installed in one unit, preferably one block. This allows one to simplify the piping and to avoid complicated structures like T-connectors, and gives space for simple piping work. The air conditioner can easily be installed in an electric car or at other facilities.

In the unit, preferably in the block, plural solenoid valve mounting holes intended to receive the plural solenoid valves are drilled in the same direction, and plural check valve mounting holes intended to receive the plural check valves are drilled in the same direction, while refrigerant passing holes to pass refrigerant are drilled perpendicular to both mounting hole groups. The flow paths and connections may only be defined by these holes drilled in the block.

In addition, the solenoid valves may include a solenoid valve to open/shut the inlet flow path to the main condenser, a further solenoid valve to open/shut the bypass flow path, and a further solenoid valve to open/shut the refrigerant returning flow path.

The said plural check valves may include a check valve installed at the bypass flow path, a check valve installed at the refrigerant main flow pipe downstream the outlet of the main condenser, a check valve installed at the refrigerant returning flow path, and a check valve installed at the refrigerant main flow pipe downstream of the outlet of the evaporator.

BRIEF DESCRIPTION OF THE DRAWINGS

Referring to the drawings, embodiments of the invention are described. In the drawings are.

DESCRIPTION OF THE PREFERRED EMBODIMENT

Figure 6:
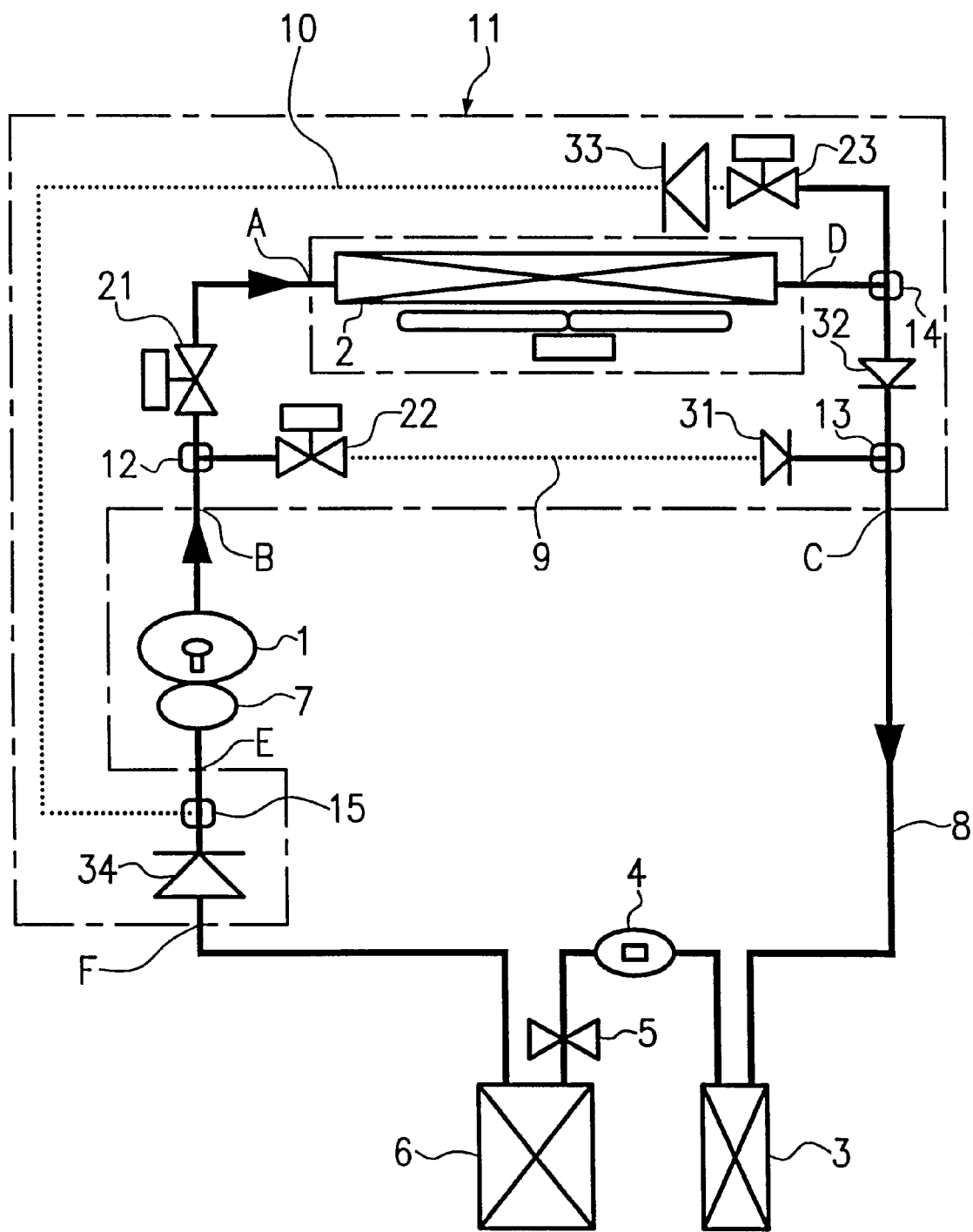
Figure 7:
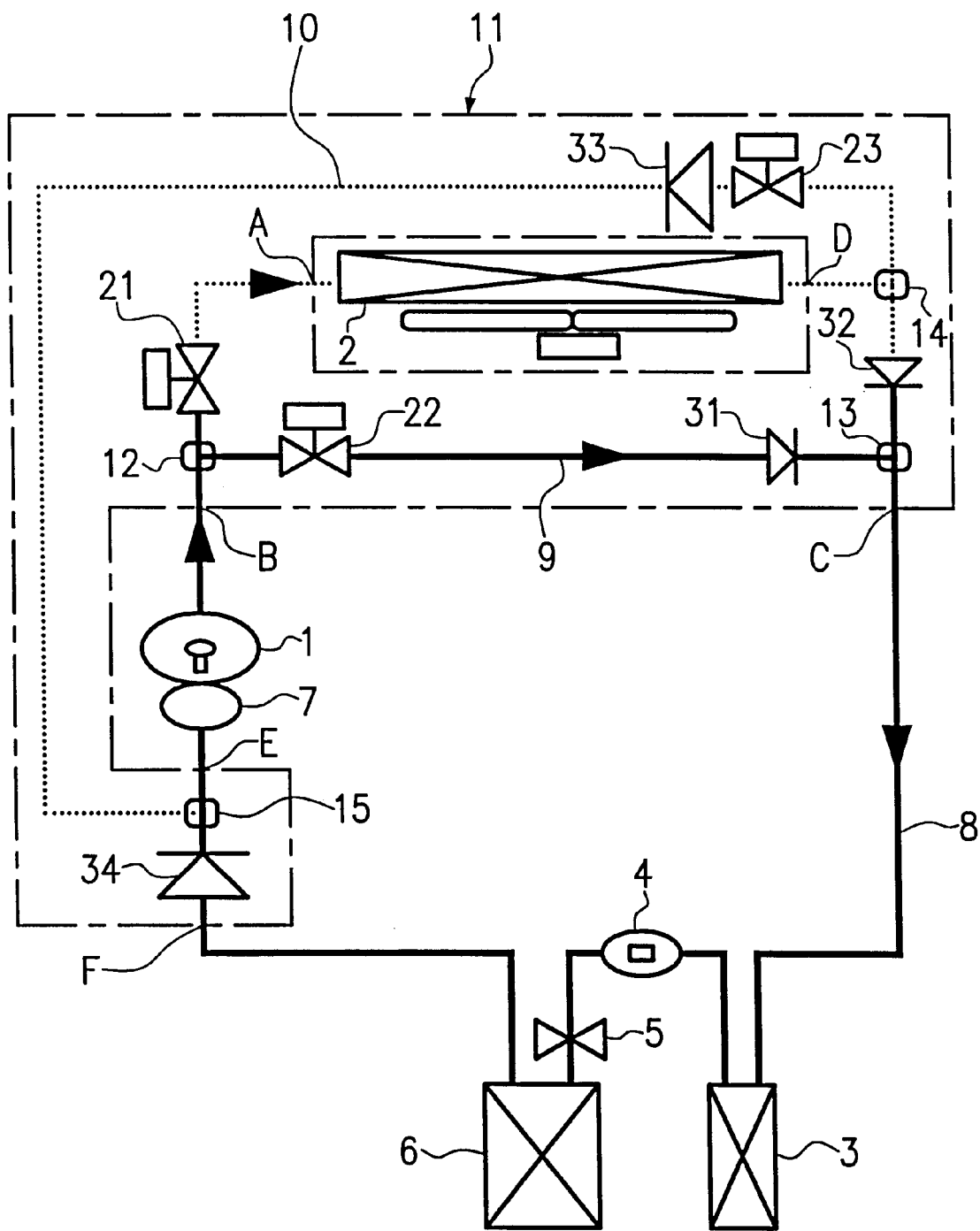
FIG. 7: a schematic piping scheme at heating state of the refrigerating cycle.
Figure 8:
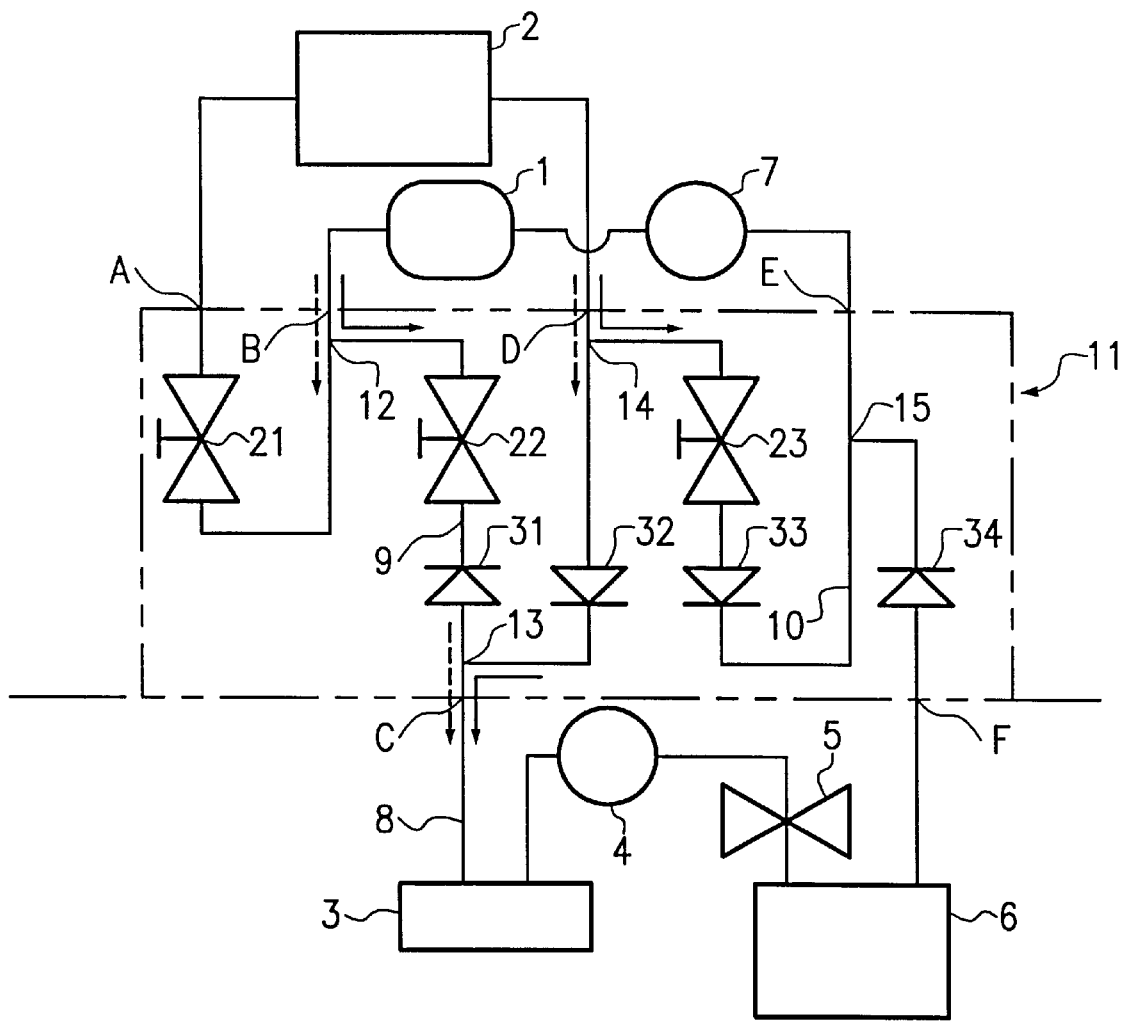
FIG. 8: a schematic piping scheme showing the refrigerating cycle with an actual layout

A car air conditioner as shown in FIGS. 6, 7, and 8 includes a compressor 1, a main condenser 2 installed at a position without connection to a car passenger compartment (not shown), a sub-condenser 3 installed at a position connected to the car passenger compartment, a liquid tank 4, a temperature regulating expansion valve 5, an evaporator 6 installed at a position connected to the car passenger compartment with the sub-condenser 3, an accumulator 7, and a refrigerant main flow pipe 8 in which a refrigerant agent can pass and circulate.

A bypass flow path 9 for not passing refrigerant through the main condenser 2 is connected to the refrigerant main flow pipe 8 at a first connection 12 located between the output of the compressor 1 and the inlet of the main condenser 2, and at a second connection 13 located between the outlet of the main condenser 2 and the inlet of the sub-condenser 3. A refrigerant returning flow path 10 to return refrigerant accumulated at the main condenser 2 to the compressor 1 is connected to the refrigerant main flow pipe 8 at a third connection 14 located at the outlet of the main condenser 2, and at a fourth connection 15 located between the outlet of the evaporator 6 and the inlet of the accumulator 7.

At the inlet of the main condenser 2, a first solenoid valve 21 to open/shut the refrigerant main flow pipe 8 is installed. A second solenoid valve 22 to open/shut the bypass flow path 9 is located at the midway of the bypass flow path 9. A third solenoid valve 23 is located between main flow pipe 8 and flow path 10 to open/shut the refrigerant returning flow path 10.

A second check valve 32 is installed between the second and third connections 13 and 14 on the way of the bypass flow path 9 and at the refrigerant main flow pipe 8 downstream of the outlet of the main condenser 2. A first check valve 31 is located between connections 13 and 12. Both check valves 31, 32 serve to pass the refrigerant from upstream to downstream only.

On the way of the refrigerant returning flow path 10, a third check valve 33 is installed between connections 14, 15 to pass refrigerant from the outlet of the main condenser 2 to only upstream of the accumulator 7. At the refrigerant main flow pipe 8 (upstream of connection 15 at the refrigerant returning flow path 10) and downstream of the outlet of the evaporator 6, a fourth check valve 34 is installed to pass the refrigerant from upstream to downstream only.

With this general configuration, at cooling operation as shown in FIG. 6 the refrigerant circulates through the main condenser 2, but does not pass the bypass flow path 9, since the first solenoid valve 21 is open, the second solenoid valve 22 is closed and the third solenoid valve 23 is closed as well, in order to cool the car passenger compartment by heat exchanging to atmosphere at the evaporator 6. There is a little heating by heat exchanging to atmosphere at the sub-condenser 3, but the sub-condenser 3 is smaller compared with the main condenser 2, such that the amount of heat exchange is much smaller than that to atmosphere at the evaporator 6.

On the other hand, at heating operation as shown in FIG. 7, the refrigerant circulates the bypass flow path 9 without passing through the main condenser 2, since the first solenoid valve 21 is closed, the second solenoid valve 22 is opened, in order to exchange heat to atmosphere at the sub-condenser 3 and at the evaporator 6.

The refrigerant accumulated in the main condenser 2 is returned to the refrigerant main flow pipe 8 via the refrigerant returning flow path 10. As a result, nearly the total amount of refrigerant circulates in the refrigerant main flow pipe 8 through the bypass flow path 9. At that time, compared to the amount of heat exchanged to atmosphere at the evaporator 6, the amount of heat exchanged to atmosphere at the sub-condenser 3 is larger than the amount of heat generated at the compressor 1, resulting in heating the car passenger compartment. At the evaporator 6 moisture is removed for comfortable heating with less humidity.

In an equipment actually applied, a block 11 (indicated in FIGS. 6, 7, and 8 in dash-dotted lines, more clearly shown in FIGS. 1–5) is equipped with installed parts and piping structures. The fully equipped block 11 defines one structural unit, comprising the bypass flow path 9, the refrigerant returning flow path 10, the four connections 12, 13, 14, and 15, the first to third solenoid valves 21, 22, and 23, and the first to fourth check valves 31, 32, 33, and 34.

The block 11 is a rectangular parallelepiped at one side of which (upper side in FIG. 1) three holes 41, 42, and 43 to install solenoid valves are drilled in parallel. The first solenoid valve 21 is installed at the first solenoid mounting hole 41, the second solenoid valve 22 is installed at the second solenoid mounting hole 42, and the third solenoid valve 23 is installed at the third solenoid mounting hole 43.

At the side opposite to said one side of the block 11 (at the lower side in FIG. 1), four holes to install check valves 51, 52, 53, and 54 are drilled in parallel. The first check valve 31 is installed in the first check valve mounting hole 51, the second check valve 32 is installed in the second check valve mounting hole 52, the third check valve 33 is installed in the third check valve mounting hole 53, and the fourth check valve 34 is installed at the fourth check valve mounting hole 54.

In the first solenoid mounting hole 41, the second check valve mounting hole 52 and the fourth check valve mounting hole 54, blind holes 71, 73, and 75 are drilled extending the respective hole axes. The oppositely located second solenoid valve mounting hole 42 and the first check valve mounting hole 51 are mutually aligned with their axes and are connected with each other by a coaxial penetration hole 72. The oppositely located third solenoid valve mounting hole 43 and the third solenoid valve mounting hole 53 are mutually aligned with their axes and are connected with each other by a coaxial penetration hole 74.

From a further third side (situated between the upper and lower block sides in FIG. 1) of the block 11, a first refrigerant passing hole 61 is drilled at a position such that is connected to the blind hole 71 which continues the first solenoid valve mounting hole 41. A second refrigerant passing hole 62 is drilled from the same further block side at a middle position such that it intersects the side wall of the first solenoid valve mounting hole 41 as well as the side wall of the second solenoid valve mounting hole 42. A third refrigerant passing hole 63 is drilled into the fourth block side at a middle position such that it intersects the side wall of the first check valve mounting hole 31 as well as the side wall of the second check valve mounting hole 32. A fourth refrigerant passing hole 64 is drilled at the third block side at a middle position such that it is intersecting the side wall of the third solenoid valve mounting hole 43 as well as the side wall of the blind hole 73 which continues the second check valve mounting hole 52. A fifth refrigerant passing hole 65 is drilled at the third block side in a middle position such that it intersects the side wall of the third check valve mounting hole 53 and the side wall of the fourth check valve mounting hole 54. A sixth refrigerant passing hole 66 is drilled into the fourth block side at a position such that it is connected to the blind hole 75 continuing the fourth check valve mounting hole 54.

In this embodiment, the parallel first, second, fourth and fifth refrigerant passing holes 61, 62, 64, and 65 are drilled in the same direction into the third block side, and the third and sixth refrigerant passing holes 63 and 66 are drilled with opposite direction into the fourth block side. These holes could, however, be drilled in either direction. Even all holes could be drilled in the same direction.

The refrigerant passing holes 61 through 66 are all blind holes not penetrating the block 11. An opening A of the first refrigerant passing hole 61 is connected to the inlet of the main condenser 2. An opening B of the second refrigerant passing hole 62 is connected to the outlet of the compressor 1. An opening C of the third refrigerant passing hole 63 is connected to the inlet of the sub-condenser 3. An opening D of the fourth refrigerant passing hole 64 is connected to the outlet of the main condenser 2. An opening E of the fifth refrigerant passing hole (5) is connected to the inlet of the accumulator 7. An opening F of the sixth refrigerant passing hole 66 is connected to the outlet of the evaporator 6.

As a result the connection between the first solenoid valve mounting hole 41 of the refrigerant passing hole 62 and the second solenoid valve mounting hole 42 forms connection 12. The connection between the first check valve mounting hole 51 of the third refrigerant passing hole 63 and the second check valve mounting hole 52 forms connection 13. The connection between the blind hole 73 connected to the second check valve mounting hole 52 of the fourth refrigerant passing hole 64 and the third solenoid valve mounting hole 43 forms connection 14. The connection between the third check valve mounting hole 53 of the firth refrigerant passing hole 65 and the fourth check valve mounting hole 54 forms connection 15.

Penetration hole 72 connecting the second solenoid valve mounting hole 42 and the first check valve mounting hole 51 forms bypass flow path 9. Penetration hole 74 connecting the third solenoid valve mounting hole 43 and the third check valve mounting hole 53 forms the refrigerant returning flow path 10. By this means, drilling holes in four (or three) directions into the block 11 are needed only which easily form the bypass flow path 9, refrigerant returning flow path 10 and the four connections 12, 13, 14, and 15. Simple manufacturing and preparation of the raw block 11 then is achieved.

The check valves 31 through 34 have the same structure. A ring seal part 302 is mounted to a peripheral part of a valve body 301 (a poppet valve body). Valve body 301 is pressed against a valve seat 304 by a compression spring 303 from the downstream side to the upstream side. As a result, the refrigerant flow from downstream to upstream normally is completely blocked. The refrigerant only can flow as soon as the pressure difference between the upstream and downstream sides exceeds the applied force of spring 303.

The solenoid valves 21 through 23 have the same structure. By reversing the flow of the electric current to the solenoid 201 and 202 the valve will open/shut. Each valve is a self-keeping pilot type solenoid valve keeping the existing state even after the current is shut i.e., is designed to maintain automatically the open or the closed position after the current is shutoff, and needs a reversal of the electric flow to switch from one state to the other.

Figure 1:
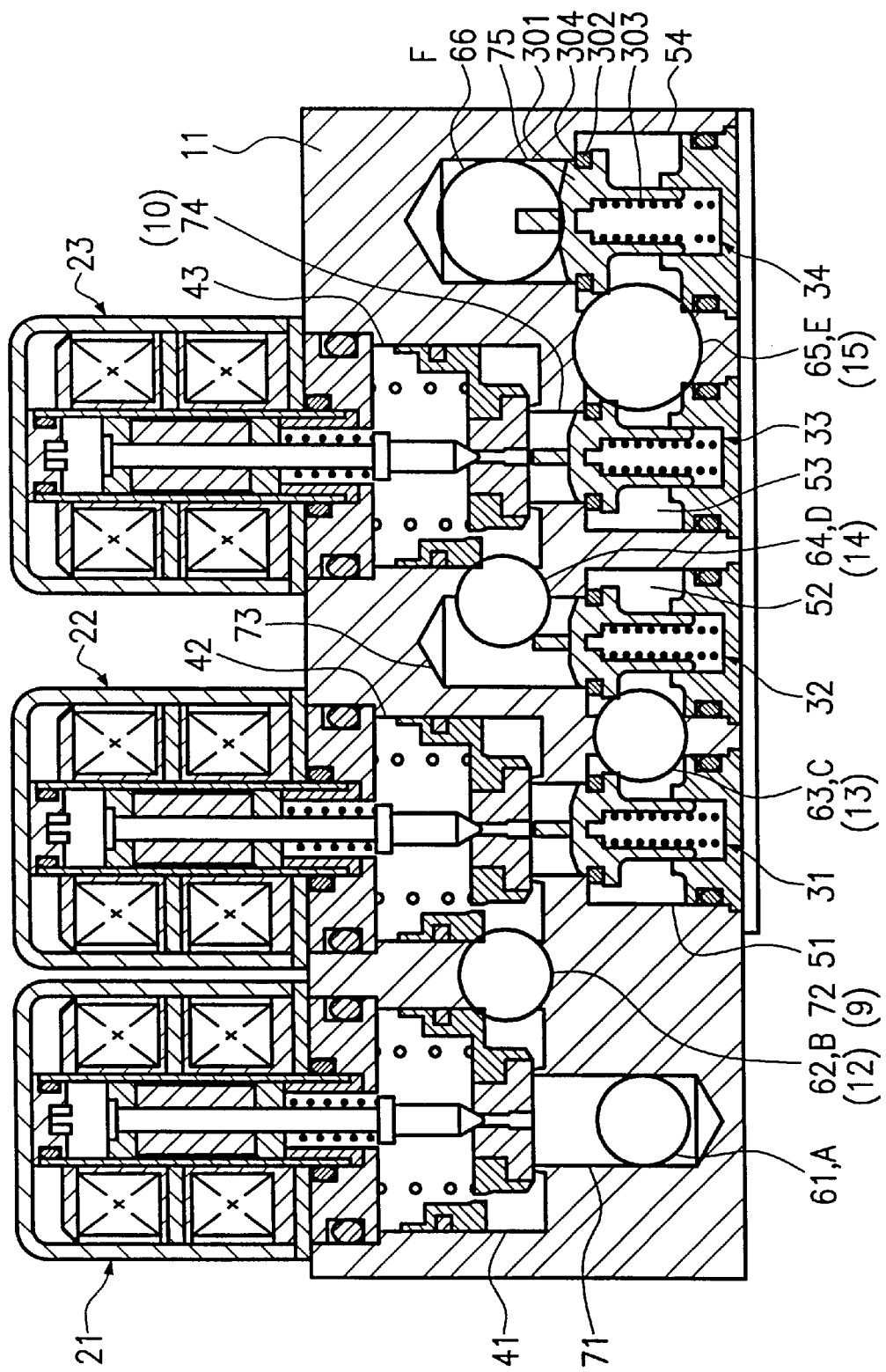
FIG. 1: a horizontal cross-sectional view of a part of a block, equipped with valves.
Figure 2:
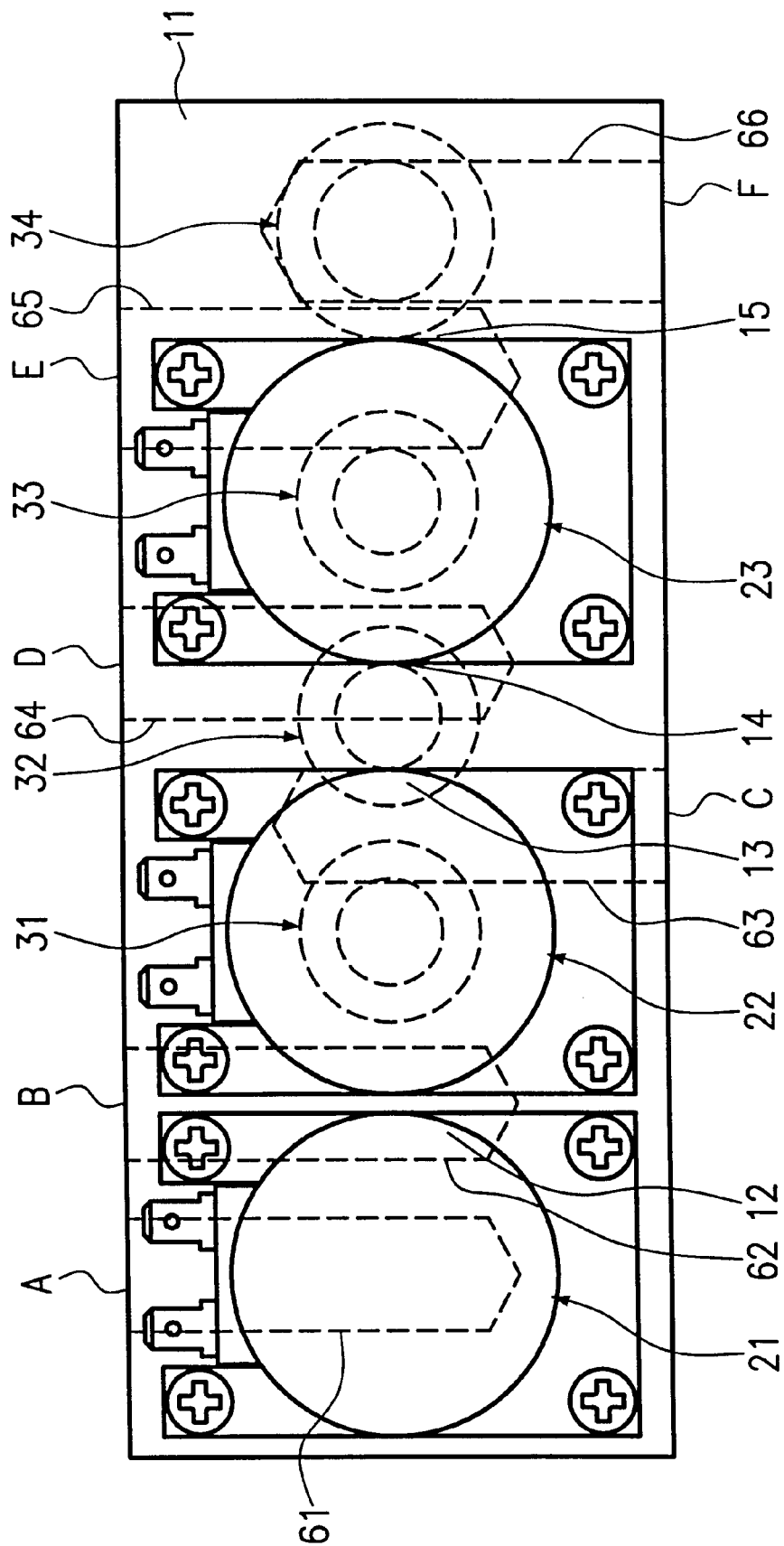
FIG. 2: a plan view of the part of the block of FIG. 1, FIG. 3: a vertical cross-sectional view of a solenoid valve.
Figure 3:
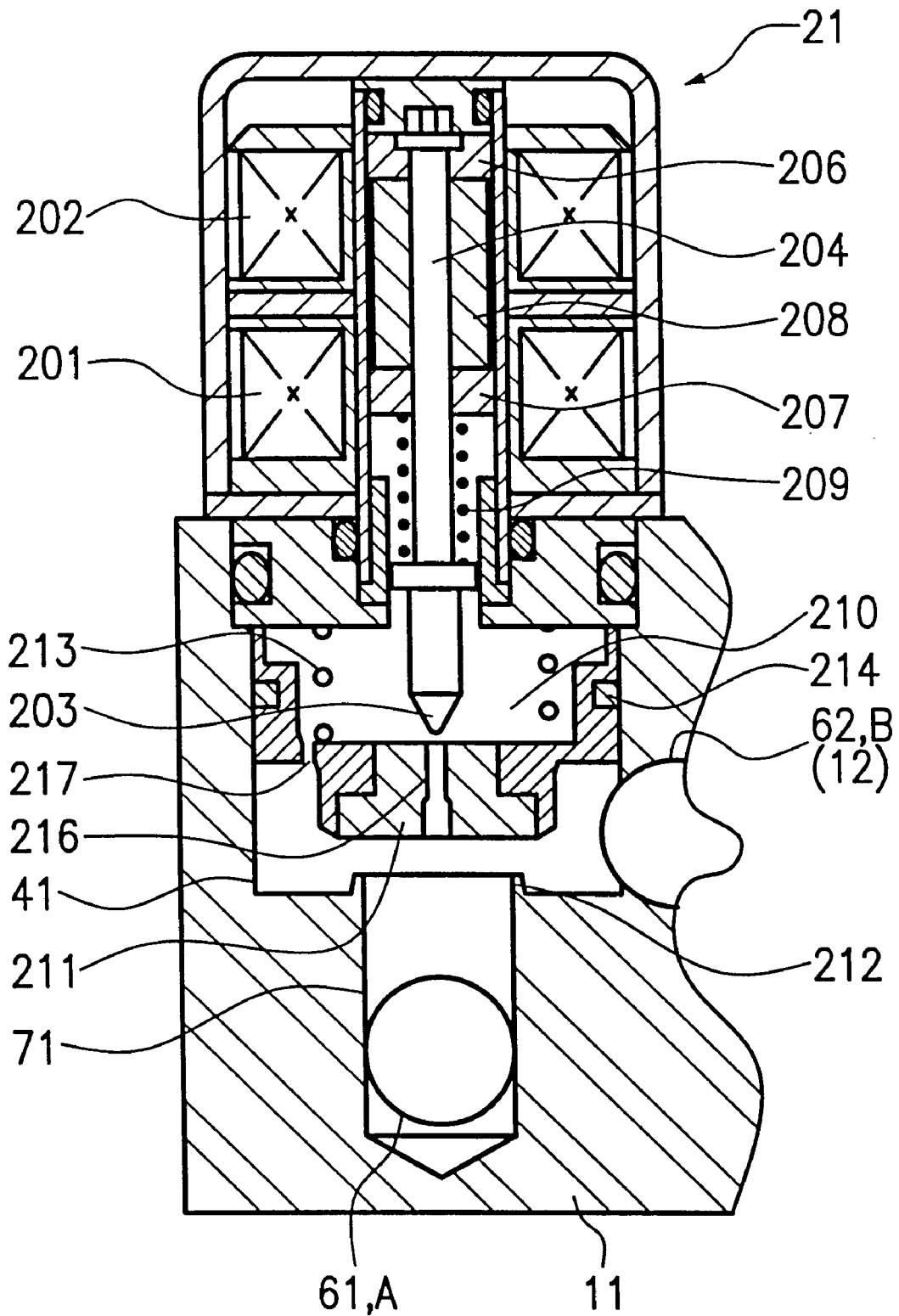

FIG. 3 shows an open state of the first solenoid valve 21. In two magnetic oils 201 and 202, connected in series, a coil is wound in the same direction. A pilot valve body 203 is located at the tip of a moving rod 204, which is arranged for free displacement in axial direction. A cylindrical permanent magnet 208 with iron rings 206 and 207 at both ends is loosely inserted at rod 204. The permanent magnet 208 can move freely in the axial direction with the iron rings 206 and 207 on rod 204 and is pressed towards the upper base end of the moving rod 204 by a compression spring 209 with weaker force than the thrust force of the solenoid valve 21 upon actuation. Spring 209 is seated on a land of rod 204.

A main valve body 211, controlled by pilot valve assembly 203, 216, is provided for cooperation with valve seat 212 formed in the way between refrigerant flow paths 61 and 62. Main valve body 211 is actuated by a second compression coil spring 213 in the direction from the solenoids 201, 202 onto the valve seat 212. Spring 213 is seated against a lower side of a solenoid fixture. At the upper side of the main valve body 211, facing rod 204, a pilot chamber 210 is confined also by a bulkhead of the main valve body 211. A sealing element 214 is installed at the periphery of the bulkhead of the main valve body 211 to seal between pilot chamber 210 and the refrigerant flow path 61 and 62. The main valve body 211, including its bulkhead, is axially moveable in relation to main seat 212. In main valve body 211, a pilot hole 216 is drilled forming a passage and pilot valve seat for pilot valve body 203. A narrow leak hole 217 is, e.g., provided at an outer position of the main valve body 211.

At a state in which the pilot valve body 203 is off-seated as shown in FIG. 3, the pressure inside pilot chamber 210 reaches the same as that in the refrigerant flow path 61 at lower pressure side by passing through pilot hole 216. This keeps the main valve body 211 off-seated by the pressure difference to the high pressure refrigerant outside the valve seat 212.

Figure 4:
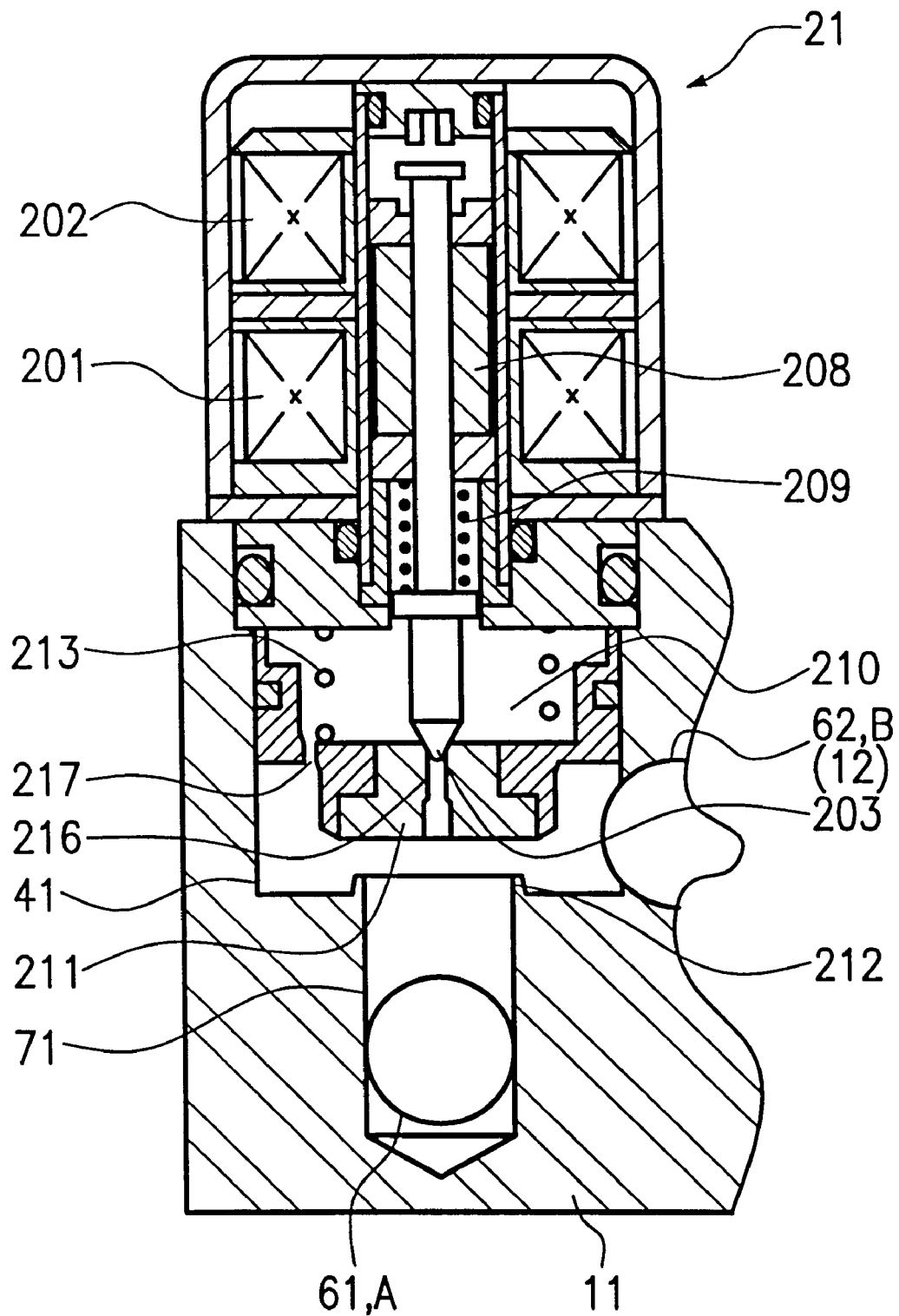
FIG. 4: a vertical cross-sectional view of transient from closed state to open state of the solenoid valve of FIG. 3, FIG. 5: a vertical cross-sectional view of the closed solenoid valve of FIG. 3, FIG. 6: a schematic piping scheme of an embodiment of a car air conditioner at cooling state of the refrigerating cycle.

As shown in FIG. 4, electrically actuating the magnetic coils 201 and 202 results in blocking the pilot hole 216 by pilot valve body 203. The permanent magnet 208 moves in a movement to the specified position and pushes rod 204 downwardly via spring 209. However, the pilot valve 203 only touches the main valve body 211 for closing pilot hole 216. The weak coil spring 209 is kept compressed while the main valve body 211 still is off-seated.

Figure 5:
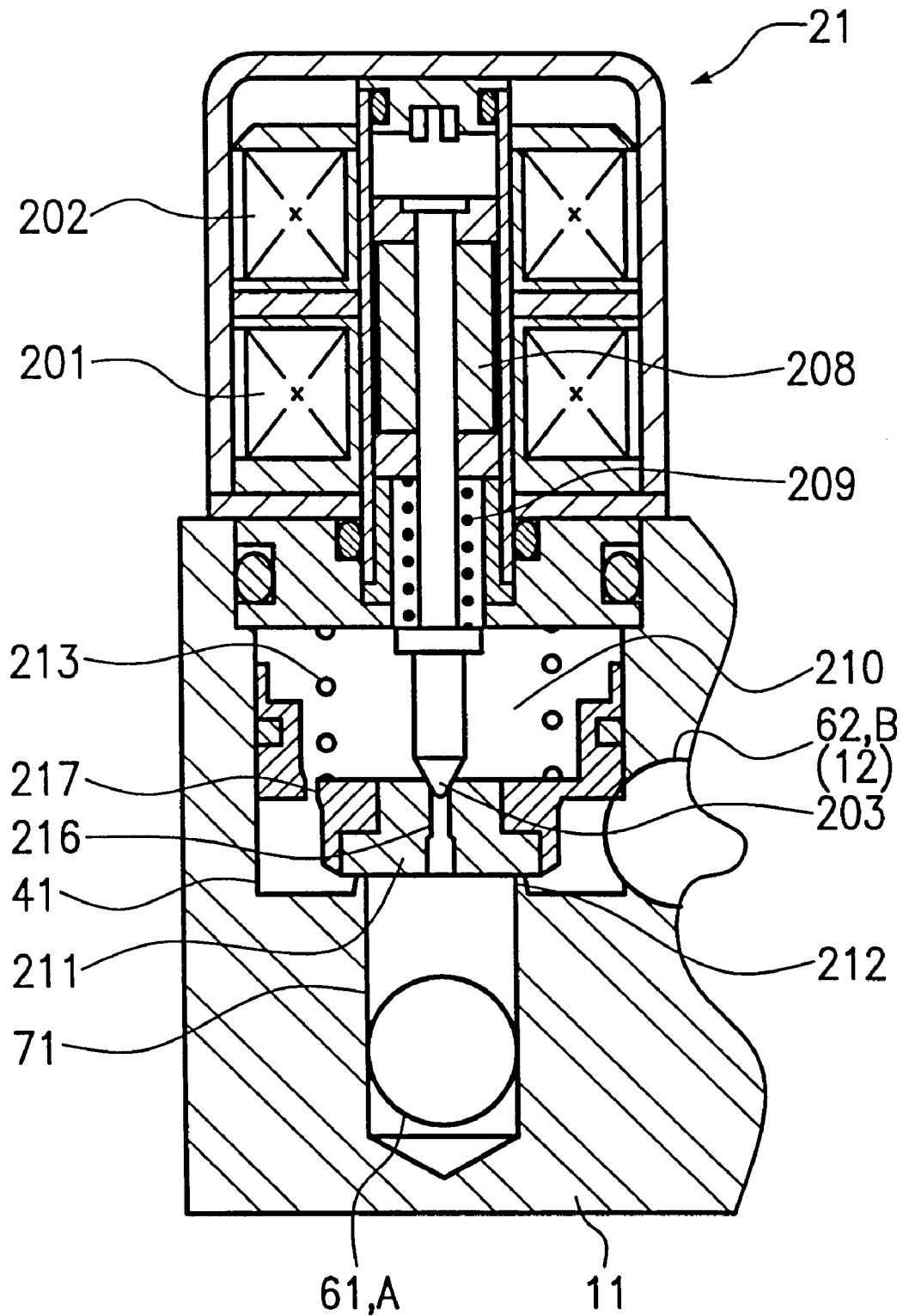

With the time passing, pressure inside pilot chamber 210 increases by high pressure refrigerant passing leak hole 217 and the main valve 211 as shown in FIG. 5 becomes pressed onto valve seat 212 to separate the refrigerant flow paths 61 and 62. Rod 204 follows this movement and keeps hole 216 closed.

Since the bypass flow path, the refrigerant returning flow path, the connection between both flow paths and the refrigerant main flow pipe, as well as plural solenoid valves and plural check valves to control passing state in both flow paths to the refrigerant main flow pipe are installed and provided in one block belonging to the heating system accompanied with the sub-condenser, the piping structure is simplified and complicated structures are avoided. This gives free installation space for piping work. Particularly, the block can be easily installed at an electric vehicle or other facilities.

More specifically, in the block locally concentrating structural component parts and flow paths, plural solenoid valve mounting holes to install plural solenoid valves can be drilled with the same direction, as well as plural check valve mounting holes to install plural check valves from the opposite side can be drilled with the same direction. Advantageously, the refrigerant passing holes to pass refrigerant can be drilled perpendicular to both mounting hole groups. These latter holes drilled in the block form the necessary flow paths and also all connections to simplify piping structures and piping works.

I claim:

1. Air conditioner comprising: a compressor arranged in a main refrigerant pipe; a condenser assembly comprising a main condenser downstream of the compressor and a sub-condenser downstream of the main condenser and arranged for heating an enclosed space; an expansion valve and an evaporator upstream of said compressor; a refrigerant return flow path between an outlet of the main condenser and an upstream inlet of said compressor; a refrigerant bypass flow path bypassing said main condenser; and a block including 1) a plurality of flow paths and flow path interconnections defining different refrigerant flow configurations of respective cooling and heating operating states of the air conditioner, and 2) solenoid valves and check valves which are mounted in solenoid valve mounting holes and check valve mounting holes in said block, which are located in the flow paths, and which control the refrigerant flow for each of the different refrigerant flow configurations, wherein said block has internal connecting passages and internal flow passages, wherein each of said mounting holes and each of said internal flow passages form an opening at at least one exterior side of said block, and wherein the openings formed by said internal flow passages define refrigerant communication ports connected to at least one of said compressor, said main condenser, said sub-condenser, and said evaporator.

2. Air conditioner as in claim 1, wherein the block has a shape of a rectangular parallelepiped, wherein all openings of the solenoid valve mounting holes are commonly located in one of the exterior sides of the block wherein all openings of the check valve mounting holes are commonly located in another of the exterior sides of the block, and wherein the openings of the internal flow passages are either commonly located in a further one of the exterior sides of the block or are distributed on two opposite sides of the further exterior sides.

3. Air conditioner as in claim 2, wherein all of said mounting holes are oriented with hole axes thereof parallel to each other and perpendicular to a respective associated exterior block side, and wherein the internal flow passages are drilled holes drilled with mutual parallel hole axes perpendicular to the respective associated other exterior block side.

4. Air conditioner as in claim 2, wherein each of a plurality of said internal connecting passages extends between an associated solenoid valve mounting hole and an associated check valve mounting hole, and wherein each of said solenoid valve mounting holes faces an associated one of said check valve mounting holes and is formed in an oppositely located exterior side of the block from the associated check valve mounting hole.

5. Air conditioner as in claim 3, wherein the internal flow passages are blind holes oriented perpendicular with respect to the orientation of the axes of all of the mounting holes, each blind hole intersecting either at least one of the mounting holes or one of the internal connecting passages.

6. Air conditioner as in claim 1, wherein at least some of the internal connecting passages form the refrigerant return flow path and the refrigerant bypass flow path.

7. Air conditioner as in claim 1, wherein all of the solenoid valve mounting holes are drilled into the block in the same direction and with parallel orientation of their hole axes from a first exterior side of the block, wherein all of the check valve mounting holes are drilled in the same direction and with parallel orientations of their hole axes from another exterior side of said block opposite to the first exterior side, and wherein refrigerant passing holes, defining said internal flow passages, are drilled perpendicularly to said solenoid valve mounting holes and to said check valve mounting holes.

8. Air conditioner as in claim 1, wherein the refrigerant return flow path and the main refrigerant pipe and connections between the refrigerant bypass flow path and the main refrigerant pipe are formed within said block by respective common intersections between the internal flow passages and either 1) two mutually adjacent mounting holes or 2) a mounting hole and an adjacent internal connecting passage.

9. Air conditioner as in claim 1, wherein the solenoid valves include a solenoid valve to open/shut the main refrigerant pipe upstream of the main condenser, a solenoid valve to open/shut the refrigerant bypass flow path, and a solenoid valve to connect/separate the refrigerant return flow path and the main refrigerant pipe.

10. Air conditioner as in claim 1, wherein the check valves include a check valve installed in the refrigerant bypass flow path, a check valve installed in the main refrigerant flow pipe close to a downstream outlet of the main condenser, a check valve installed in the refrigerant return flow path and a check valve installed in the main refrigerant flow pipe close to a downstream outlet of the evaporator.

11. Air conditioner comprising: a compressor arranged in a main refrigerant pipe; a condenser assembly comprising a main condenser downstream of the compressor and a sub-condenser downstream of the main condenser, wherein said sub-condenser is arranged for heating an enclosed space; an expansion valve and an evaporator upstream of said compressor, a refrigerant return flow path between an outlet of the main condenser and an upstream inlet of said compressor; a refrigerant bypass flow path bypassing said main condenser; and a block including 1) a plurality of flow paths and flow path interconnections defining different refrigerant flow configurations for respective cooling and heating operating states of the air conditioner, and 2) solenoid valves and check valves which are located in the flow paths and which control the refrigerant flow for each of the different refrigerant flow configurations, wherein the refrigerant bypass flow path, the refrigerant return flow path, and connections 1) between the refrigerant bypass flow path and the refrigerant return flow path and the main refrigerant flow pipe and 2) between the refrigerant bypass flow path and the refrigerant return flow path and solenoid valves and check valves that control flow to the main refrigerant flow pipe are integrated into the block.

12. An air conditioner comprising:

(A) a main refrigerant pipe;

(B) a compressor which is arranged in said main refrigerant pipe and which has an inlet;

(C) a condenser assembly which is located downstream of said compressor in a direction of refrigerant flow and which includes 1) a main condenser and 2) a sub-condenser which is arranged to heat a conditioned space when said air conditioner is in a heating operating state;

(D) an expansion valve which is located between said sub-condenser and said compressor in the direction of refrigerant flow;

(E) an evaporator which is located between said expansion valve and said compressor in the direction of refrigerant flow;

(F) a refrigerant return path which connects an outlet of said main condenser to said inlet of said compressor;

(G) a refrigerant bypass flow path which bypasses said main condenser;

(H) a block which has a plurality of exterior sides and which has formed therein
  (1) solenoid valve mounting holes opening at at least one of said exterior sides,
  (2) check valve mounting holes opening at at least one of said exterior sides,
  (3) a plurality of internal flow passages having openings defining refrigerant communication ports communicating with at least one of said main refrigerant pipe, said compressor, said evaporator, said main condenser, and said sub-condenser, and
  (4) a plurality of internal connecting passages connecting selected ones of said internal flow passages to one another and/or to selected ones of said solenoid valve mounting holes and/ or to selected ones of said check valve mounting holes;

(I) a plurality of solenoid valves which are mounted through said openings in said solenoid valve mounting holes and which are selectively actuatable to switch refrigerant flow configurations of said air conditioner between said heating operating state and a cooling operating state; and (J) a plurality of check valves which are mounted through said openings in said check valve mounting holes.

13. An air conditioner comprising:

(A) a main refrigerant pipe;

(B) a compressor which is arranged in said main refrigerant pipe and which has an inlet;

(C) a condenser assembly which is located downstream of said compressor in a direction of refrigerant flow and which includes 1) a main condenser and 2) a sub-condenser which is arranged to heat a conditioned space when said air conditioner is in a heating operating state;

(D) an expansion valve which is located between said sub-condenser and said compressor in the direction of refrigerant flow;

(E) an evaporator which is located between said expansion valve and said compressor in the direction of refrigerant flow;

(F) a refrigerant return path which connects an outlet of said main condenser to said inlet of said compressor;

(G) a refrigerant bypass flow path which bypasses said main condenser;

(H) a block which is in a shape of a rectangular parallelapepied, which has a plurality of exterior sides, and which has formed therein (1) solenoid valve mounting holes all opening at a first one of said exterior sides, (2) check valve mounting holes all opening at a second one of said exterior sides, (3) a plurality of internal flow passages having openings defining refrigerant communication ports communicating with at least one of said main refrigerant pipe, said compressor, said evaporator, said main condenser, and said sub-condenser, wherein said refrigerant communication ports either a) are all located on a single further one of said exterior side, or b) are distributed on two further ones of said external sides which are located opposite one another, and (4) a plurality of internal connecting passages connecting selected ones of said internal flow passages to one another and/or to selected ones of said solenoid valve mounting holes and/or to selected ones of said check valve mounting holes;

(I) a plurality of solenoid valves which are mounted through said openings in said solenoid valve mounting holes and which are selectively actuatable to switch refrigerant flow configurations of said air conditioner between said heating operating state and a cooling operating state; and (J) a plurality of check valves which are mounted through said openings in said check valve mounting holes.

* * * * *